United States Patent Office 3,543,230
Patented Nov. 24, 1970

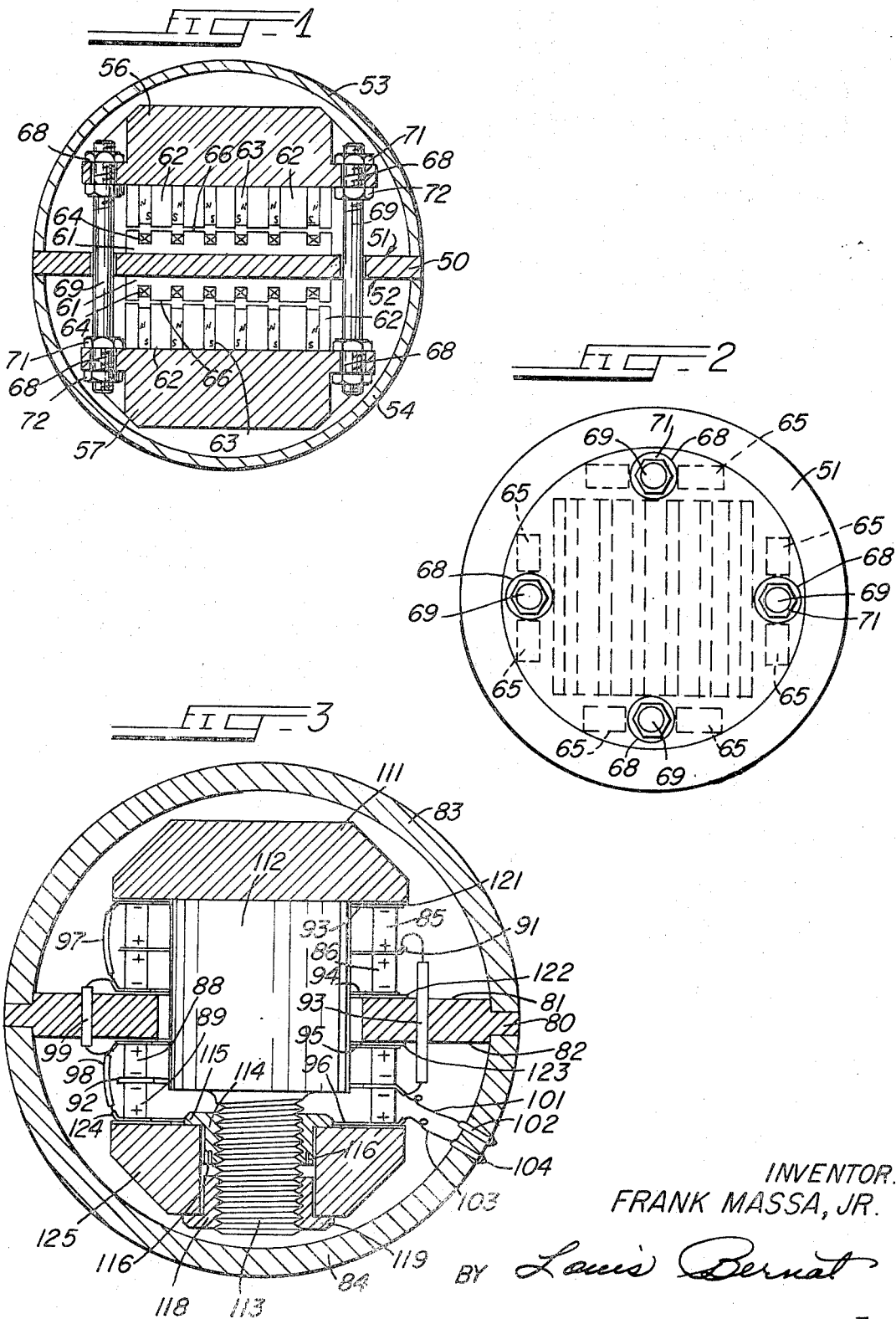

1

3,543,230
DEEP WATER ELECTROACOUSTIC
TRANSDUCER
Frank Massa, Jr., Cohasset, Mass., assignor to Massa
Division, Dynamics Corporation of America, Hingham,
Mass.
Filed Apr. 21, 1969, Ser. No. 817,808
Int. Cl. H04r 17/00
U.S. Cl. 340—10　　　　　　　　　　　　　　13 Claims

ABSTRACT OF THE DISCLOSURE

Two embodiments of an inertial, push-pull, spherical, underwater transducer use a pair of mass elements rigidly joined together to provide a single degree of freedom for the vibrating system.

---

This invention relates to electroacoustic transducers for use in deep water, and more particularly to improvements in inertial type transducers.

One example of inertial transducers of the type described herein may be found in U.S. Pat. No. 3,319,220. Many of the details shown in this application are explained more fully in the earlier patent.

Generally speaking, the type of transducers contemplated herein employ push-pull, electroacoustic vibration systems arranged to drive a stiff circular plate or piston. Usually, the plate is located in the equatorial plane of a sphere. To construct this transducer, an inertial mass element is spring suspended from each side of the circular plate, with associated drivers for converting electrical signals into vibrations of the mass elements. Then, a pair of hemispherical shells are placed over the inertial mass elements and drivers, and sealed to the periphery of the circular plate.

A number of problems are found in this type of transducer. More particularly, it is necessary to provide identical symmetrical systems to avoid independent vibrational modes from the two masses. Thus, the two suspension and inertial systems must be exactly balanced so that they operate in unison at the resonant frequency. Moreover, the usual electromagnetic design is better suited for operation in the lower audible frequency region. At higher frequencies, the electromagnetic design becomes either inefficient or very costly because extremely thin laminations must be used to reduce magnetic losses. Still other disadvantages and problems will occur to those who are skilled in the art.

Accordingly, an object of the invention is to provide new and improved electroacoustic transducers, especially—but not exclusively—well suited for use in deep water. In this connection, an object is to provide an inertial transducer having two separate vibrational units which inherently operate in a single mode of vibration; or, conversely stated, the design does not allow the two separate vibrational units to vibrate in independent modes. Yet another object is to provide a transducer having a single mode of vibration.

Another object is to provide general purpose underwater transducers adapted to operate at any ocean depth. Here an object is to provide transducers having the power of two vibrating mass elements, but with only one degree of vibrational freedom.

Yet another object of this invention is to provide an improved construction of underwater transducers of the inertial, push-pull driven type.

A further object of this invention is to provide two separate inertially suspended vibrating elements which operate in a single degree of freedom.

A still further object is to provide a push-pull ceramic transducer drive system having two inertial mass elements which acts as a combined single inertial vibrating mass.

Another object is to provide a method of rigidly interconnecting two independently suspended mass elements driven by an inertial push-pull ceramic transducer to achieve a unitary vibrating structure while maintaining a predetermined compression stress on the ceramic assembly.

Still another object is to enable a fine adjustment in the resonant frequency of an electromagnetic, push-pull, inertially driven transducer. Here an object is to provide means for making micrometer adjustments of the air gap dimension by a simple mechanical adjustment.

In keeping with an aspect of the invention, these and other objects are accomplished by providing a pair of mass elements rigidly interconnected to insure a single degree of freedom for the combined inertial structure. In one embodiment, these mass elements are driven by a ceramic push-pull arrangement. Both the single degree of freedom and a predetermined compressional stress upon the ceramic rings are provided by a stress bolt running through a mass element, a ceramic ring, a supporting base section, another ceramic ring, and a second mass element, in the order named. In another embodiment, similar results are achieved by four similar bolts interconnecting a pair of electromagnetically driven mass elements.

These and other objects and features of the invention will be understood best from a study of the following specification, when taken with the attached drawing in which:

FIG. 1 is a cross-sectional view showing a first embodiment of the invention using an electromagnetic transducer having a pair of air gaps;

FIG. 2 is a plan view of the electromagnetic structure of FIG. 1, with the housing structure removed; and FIG. 3 is a cross-sectional view of a second embodiment of the invention using two pairs of piezoelectric rings for driving two inertial mass elements.

The basic elements of an inventive inertial, electromagnetic transducer, constructed according to the invention, includes a flat, rigid support disk or plate 50, having upper and lower parallel plane surfaces 51 and 52. A shell-like housing is formed from two, preferably hemispherical, cup-shaped housing members 53 and 54 which are attached to the peripheral surfaces of the plate member 50. These housing members 53, 54 are sealed in any known manner to the plate 50 to form a completely waterproof housing. Their thickness depends upon the desired operating depth.

Inside the housing, a pair of oscillating force generating transducer means (each having an associated inertial mass element 56, 57) are suspended in spaced parallel relationship above and below the surfaces 51, 52, respectively. Each of these two mass elements 56, 57 has a flat plane surface on the side facing the plate 50. Stacks of magnetic laminations 61 or 62 are attached to the plate 50 or the mass elements 56, 57, respectively. A number of permanent magnets 63 are bonded between the lamination stacks 62 and a number of electromagnetic coils 54 are bonded in the slots in lamination stacks 61. Springs 65 (FIG. 2) resiliently suspend the mass elements 56, 57 above and below the plate 50. Thus, air gaps 66 are formed between the laminations 61, 62. The currents in coils 64 create magnetic fields at the gaps 66 which are attracted to or repelled from the magnetic fields of the permanent magnet 63. All of this construction and operation is explained in greater detail in U.S. Pat. No. 3,319,220.

According to an aspect of the invention, mechanical means are provided for interconnecting the two inertial, mass elements 56, 57 to cause them to vibrate as a single vibrating unit. In greater detail, four equally spaced holes are drilled around the periphery of the weight members 56, 57. Threaded rods 69 are passed through these holes and locked in place by upper and lower lock nuts 71, 72 threaded on the rods 69 above and below the mass elements. To avoid spurious vibrations in the operating frequency range, the diameter of the rods 69 is selected so that their fundamental, transverse resonant frequency lies above the highest operating frequency of the transducer. The lock nuts are tightened after the complete transducer unit, including springs 65, is assembled.

Means are provided for making fine adjustments in the air gaps to avoid small variations in operating frequency which inherently result from normal manufacturing tolerances. This means includes the final adjustment of the air gap by the positioning of the lock nuts 71, 72. Thus, it is possible to adjust a number of transducers to have exactly the same operating frequency even when the piece parts vary within acceptable tolerance limits.

All of the adjustments and assembly procedures described up to this point, are made before the housing shells 53 and 54 are attached to the plate 50. After the assembly is complete and the electrical connections are made, the housing shells are attached to the plate 50, and the transducer is complete. The electromagnetic structures, including the air gaps 66, are driven in opposite phases to provide a push-pull operation. Thus, the completed transducer operates as an oscillating sphere driven by the massive, inertial elements and suspended magnetic assembly contained within the enclosing housing.

The electromagnetic transducer of FIGS. 1 and 2 is particularly useful in the lower audible frequency range (up to a few thousand cycles per second) where the magnetic losses can be kept low when the magnetic laminations have a practical thickness. For transducer operation in the higher audible frequencies, it is better to use a piezoelectric drive system as illustrated in FIG. 3.

The transducer of FIG. 3 is similar to the transducer illustrated in FIGS. 1 and 2. A rigid circular plate 80 has two parallel surfaces 81 and 82. The periphery of the plate 80 is undercut, top and bottom, to provide for attaching the two cup-shaped housing members 83 and 84 to form an outer spherical vibrating housing. The transducer operation is as previously described for the electromagnetic structure of FIGS. 1 and 2.

Polarized ceramic rings 85–89 provide the push-pull vibratory forces for operating the transducer. Preferably, these ceramic rings are polarized for operation along their axial mode, as is well known in the art. To obtain the push-pull operation, the ceramic rings 85, 86 are assembled with their positive potential terminals facing each other and connected to a common ring electrode 91. The ceramic rings 88, 89 are arranged with their negative potential terminals facing each other and connected to common ring electrode 92. The terminals 91 and 92 are connected together by an insulated electrical conductor 93.

The opposite electrode surfaces of the ceramic rings 85–89 are connected to the ring electrodes 93–96 which are interconnected by the insulated wires 97–99. The common terminal connection 93 is, in turn, connected to the outside of the sphere via the conductor 101 and an insulated terminal 102, as illustrated. The other ring electrodes (which are commonly connected via wires 97–99) are, in turn, connected to the outside of the sphere via conductor 103 and the insulated terminal 104.

When an A-C signal is impressed across the terminals 102 and 104, the ceramic rings 85, 86 vibrate in phase opposition to the vibrations of the ceramic rings 88, 89. This provides the push-pull operation for driving the transducer housing.

In keeping with an aspect of the invention, a massive bolt-like inertial weight member 111 is machined to have a head with a cylindrical shank or body portion 112 which terminates at a threaded end 113. A threaded tubular nut 114, having a flange portion 115, is provided for use in cooperation with the threaded end 113. Two holes 116 are provided in the exposed end of the tubular nut 114 to enable the use of a spanner wrench during final assembly. A second tubular nut 118, also having a flange 119, is provided for cooperating with the threaded end 113. When the tubular nuts 114, 118 are in position, the flanges 115, 119 define a clearance space for holding a second mass element in a clamped position.

A preferred method of assembling the ceramic rings and their associated mechanical parts is to place the flat surface of the head on the bolt-like member 111 on an assembly fixture with the threaded end portion 113 facing upward. Next, the various elements are placed, in their proper order, concentrically located over the cylindrical shank or body portion 112. When assembling the vibrating structure, the electrode end surfaces of the ceramic rings are first coated with a conductive cement which may be an epoxy.

The elements successively placed over the cylindrical body portion 112 are—in the order named—an insulator 121, terminal 93, ceramic 85, terminal 91, ceramic 86, terminal 94, insulator 122, disk 80, insulator 123, terminal 95, ceramic 88, terminal 92, ceramic 89, terminal 96, insulator 124, tubular nut 114, which is screwed all the way toward the cylindrical body section 112, and finally a second washer-like massive weight member 125 is secured in place by the tubular nut 118. It should be noted that the cylindrical nut 114 is not making any contact with the central cylindrical shank or body member 112.

The various transducer components are concentrically located with the aid of a suitable alignment fixture. The fixture applies an axial pressure of a few hundred pounds per square inch to the ceramic rings 85–89. The composite assembly is then baked to cure the cement and provide a rigid assembly. After the cementing procedure is complete, the tubular nuts 114 and 118 are tightened to give a final adjustment.

The following is a satisfactory procedure for making the final adjustment of the flanged lock nuts 114 and 118. With the lock nuts 114 and 118 loosely in place, the cemented structure is mounted in a fixture which provides an axial compressive force between the inertial mass elements 111 and 125. While the optimum compressive stress is not too critical, it may be in the general vicinity of 2,000 lbs. per square inch over the ceramic area which is being stressed. This compressive force provides a bias stress to the ceramic rings 85–89. This stress is desirable for high power operation. While the fixture holds the structure, under compression, the tubular nut 114 is turned on the threaded stud 113 by means of a spanner wrench inserted into the openings 116. As the nut 114 is turned, it comes into firm contact with the mating surface of the weight member 125. Next, the nut 118 is turned to clamp the weight member 125 securely in place. In order to prevent a loosening of the nuts 114 and 118 during operation of the transducer, it is preferable to coat the surfaces of the nuts and the threaded stud 113 with a suitable cement, such as epoxy, during the appropriate assembly stages. After completing the mechanical assembly, the electrical wiring is connected to the various electrodes. Then, the housing shell members 83 and 84 are installed and sealed to plate 80 to complete the transducer assembly.

Both the electromagnetic and ceramic embodiments of the inventive transducers have rigidly combined two inertial mass elements in a push-pull vibrating structure. Thus, the total unit operates with only a single degree of freedom, thereby achieving the desired operation characteristics for the vibrating system.

While two specific embodiments of the present invention have been shown, it should be understood that various modifications and alternative constructions may be made without departing from the true spirit and scope of the invention. For example, the rods of FIGS. 1 and 2 may be used in conjunction with the piezoelectric ceramic ring units of FIG. 3; or, the threaded stud element of FIG. 3 may be used with the electromechanical element of FIGS. 1 and 2. Therefore, the appended claims are intended to cover all equivalents which fall within the true spirit and scope of the invention.

I claim:

1. An electroacoustic transducer comprising a flat vibratile plate member having two opposite sides and a periphery, a separate oscillatory force generating transducer means attached to each of its two opposite sides, a separate intertial mass element suspended opposite each of said opposite sides of said plate, each one of said mass elements being associated with each one of said force generating means, mechanical means for rigidly interconnecting said mass elements to vibrate as a single inertial element, and means for driving said force generating means in opposite phase whereby said vibratile plate is driven push-pull from said oscillatory force generating means.

2. The invention of claim 1 wherein each of said oscillatory force generating transducer means includes an electromagnetic structure attached to opposite sides of said vibratile plate, a plurality of spring members fastened between opposite sides of said vibratile plate member and each of said inertial mass elements for maintaining an air gap on each side of said vibratile plate.

3. The invention of claim 2 wherein said mechanical interconnecting means includes one or more rods threaded at each end, each rod passing through said vibratile plate and each of said inertial mass elements, and lock nuts attached to each end of each threaded rod, said lock nuts rigidly securing each of said inertial mass elements to said rods, whereby said inertial mass elements are mechanically united to vibrate as a unitary structure.

4. The invention of claim 3 and means for adjusting the magnetic air gap responsive to changing the position of said lock nuts on each threaded rod.

5. The invention of claim 1 wherein said oscillatory force generating means includes a piezoelectric transducer element attached to each side of said vibratile plate.

6. The invention of claim 5 wherein said mechanical interconnecting means includes one or more rods threaded at each end, each rod passing through said vibratile plate and each of said inertial mass elements, and lock nuts attached to each end of each threaded rod, said lock nuts rigidly securing each of said inertial mass elements to said rods whereby said inertial mass elements are mechanically united to vibrate as a unitary structure.

7. An electroacoustic transducer comprising a flat vibratile plate member having an oscillatory force generating means comprising a piezoelectric transducing element attached to each of its two sides, each of said piezoelectric transducer elements including two polarized ceramic rings, an inertial mass element associated with each force generating means, a first of said inertial mass elements comprising a massive bolt-like element having a head section rigidly attached to a cylindrical body section threaded at its free end, a second of said inertial mass elements comprising a massive washer-like section having a clearance hole through its center to allow passage of said threaded end portion of said first mass element, a hole through the center of said vibratile plate to allow free passage of said cylindrical body section of said first mass element through said vibratile plate, mechanical means for rigidly interconneting said mass elements to form a single vibrating system, said interconnecting means comprising lock nuts attached to the threaded end of said body section for rigidly securing said threaded body section of said first inertial mass element to said second inertial mass element, and means for driving said force generating means in opposite phase whereby said vibratile plate is driven push-pull from said oscillatory force generating means.

8. An electroacoustic transducer comprising a flat vibratile plate member having an oscillatory force generating transducer means attached to each of its two sides, an inertial mass element associated with each force generating means, mechanical means for rigidly interconnecting said mass elements to form a single vibrating system, means for driving said force generating means in opposite phase whereby said vibratile plate is driven push-pull from said oscillatory force generating means, and a hollow cup-like housing structure rigidly sealed to the periphery of said vibratile plate member and enclosing said oscillatory force generating transducer means.

9. An electroacoustic transducer comprising a flat vibratile plate member having an oscillatory force generating tranducer means attached to each of its two opposite sides, each of said transduers including an electromagnetic structure attached to opposite sides of said vibratile plate, an inertial mass element associated with each force generating means, a plurality of spring members fastened between opposite sides of said vibratile plate member and each of said inertial mass elements for maintaining an air gap on each side of said vibratile plate, mechanical means for rigidly interconnectng said mass elements to form a single vibrating system, means for driving said force generating means in opposite phase whereby said vibratile plate is driven push-pull from said oscillatory force generating means, and a hollow cup-like housing structure rigidly sealed to the periphery of said vibratile plate member and enclosing said oscillatory force generating transducer means.

10. An electroacoustic transducer comprising a flat vibratile plate member having an oscillatory force generating piezoelectric transducer means attached to each of its two sides, an inertial mass element associated with each force generating means, mechanical means for rigidly interconnecting said mass elements to form a single vibrating system, means for driving said force generating means in opposite phase whereby said vibratile plate is driven push-pull from said oscillatory force generating means, and a hollow cup-like structure rigidly sealed to the periphery of said vibratile plate member and enclosing said oscillatory force generating transducer means.

11. A method of adjusting the compression on a piezoelectric transducer comprising the steps of:
(A) fitting a plurality of transducer elements over the shank of a massive bolt-like structure, said elements comprising a first pair of piezoelectric ceramic rings, a supporting plate, a second pair of piezoelectric ceramic rings, a massive washer-like element, and at least one lock nut,
(B) adjusting the compressional forces on said rings by tightening said lock nut,
(C) connecting electrical circuits to drive said pairs of rings in opposite phase, and
(D) fitting a pair of cup-like housings over and waterproofingly attaching them to opposite sides of said supporting plate, whereby said housing is driven by said supporting plate.

12. The method of adjusting the compressional force on a piezoelectric tranducer structure described in claim 11 wherein there are two lock nuts, one above and one below said massive washer-like element, and the further steps of:
(D) loosening the lock nuts attached to the threaded end of said bolt-like inertial mass element, (E) applying an axial force to the outer surfaces of the inertial mass elements, said force being sufficient to produce a desired compressional stress within the ceramic rings, (F) securing the lock nuts to firmly unite the massive element to the shank of said bolt-like structure, and (G) removing the axial force.

13. The method for adjusting the compressional force on the assembled piezoelectric transducer structure described in claim 11 which includes the additional steps of loosening the lock nuts which clamp the massive washer-like element, applying an axial force to the outer surfaces of the inertial mass elements sufficient to produce the desired compressional stress within the piezoelectric ceramic rings, securing the lock nuts to firmly unite the massive element to said bolt-like structure and finally, removing the axial compressional force.

References Cited
UNITED STATES PATENTS

| | | | |
|---|---|---|---|
| 3,182,284 | 5/1965 | Green | 340—10 X |
| 3,219,969 | 11/1965 | Snavely | 340—8 |
| 3,225,326 | 12/1965 | Massa | 340—8 |
| 3,309,654 | 3/1967 | Miller | 340—10 |
| 3,320,581 | 5/1967 | Sims | 340—10 |
| 3,384,868 | 5/1968 | Brown et al. | 340—8 |

RICHARD A. FARLEY, Primary Examiner

B. L. RIBANDO, Assistant Examiner